April 15, 1952     G. E. DATH ET AL     2,592,662
FRICTION SHOCK ABSORBING MECHANISM FOR RAILWAY CARS
Filed May 5, 1950
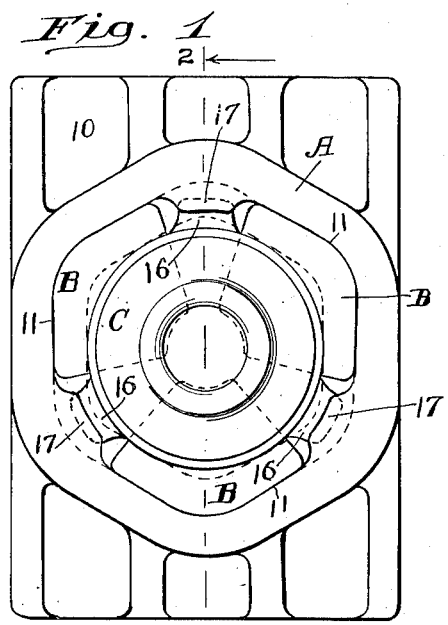
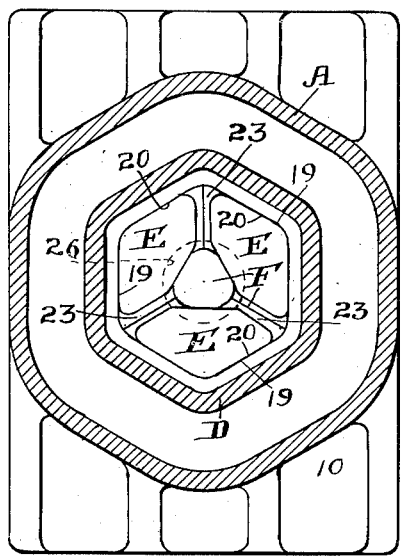
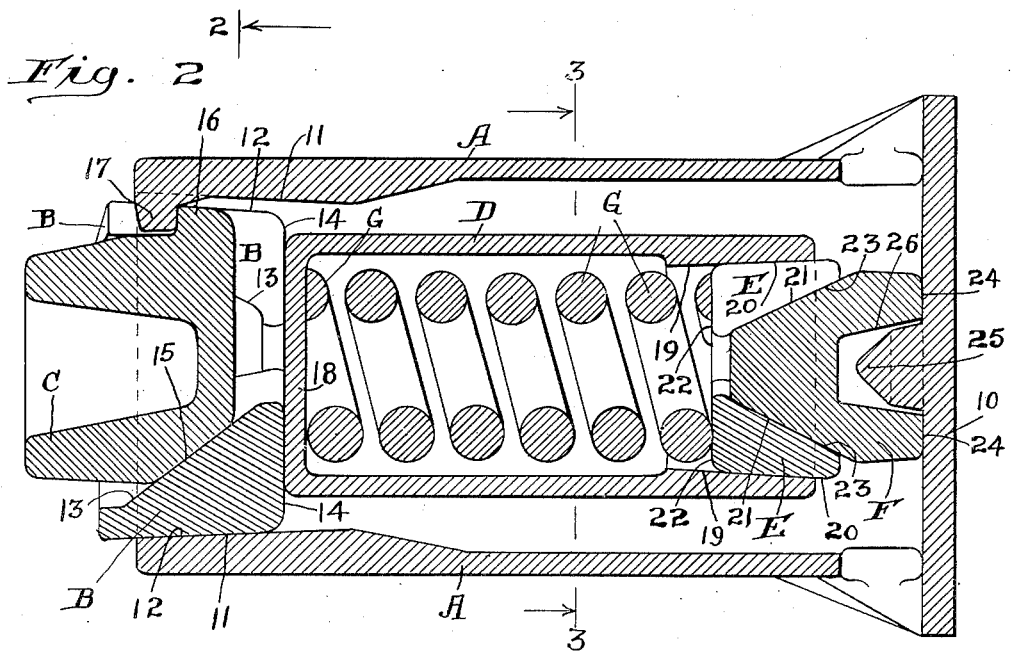
Inventors:
George E. Dath.
Arnold G. Peterson.
Henry Fuchs
Atty.

Patented Apr. 15, 1952

2,592,662

UNITED STATES PATENT OFFICE 2,592,662

FRICTION SHOCK ABSORBING MECHANISM FOR RAILWAY CARS

George E. Dath, Mokena, and Arnold G. Peterson, Chicago, Ill., assignors to W. H. Miner, Inc., Chicago, Ill., a corporation of Delaware Application May 5, 1950, Serial No. 160,292

3 Claims. (Cl. 213—34)

This invention relates to improvements in friction shock absorbing mechanisms especially adapted for draft riggings of railway cars.

One object of the invention is to provide a friction shock absorbing mechanism of high capacity, including a friction casing, a friction clutch slidingly telescoped within the casing, and yielding means of high capacity opposing inward movement of the clutch, comprising a second friction casing, a friction clutch slidable within said second casing, and springs within said second casing yieldingly opposing inward movement of the cooperating clutch.

Other objects of the invention will more clearly appear from the description and claims hereinafter following.

In the accompanying drawing forming a part of this specification, Figure 1 is an end elevational view of our improved mechanism, looking from left to right in Figure 2. Figure 2 is a longitudinal sectional view of the improved mechanism, corresponding substantially to the line 2—2 of Figure 1. Figure 3 is a transverse, sectional view, corresponding substantially to the line 3—3 of Figure 2.

As shown in the drawing, our improved friction shock absorbing mechanism comprises broadly a main casing A, a set of three friction shoes B—B—B in sliding frictional engagement with the casing A, a wedge block C in wedging engagement with the shoes, a second friction casing D, a second set of three friction shoes E—E—E in sliding engagement with the casing D, a second wedge block F in wedging engagement with the shoes E—E—E, and a spring G within the casing D, yieldingly opposing inward movement of the shoes E—E—E.

The casing A is in the form of a tubular member of hexagonal, transverse cross section, closed at the rear end, as seen in Figure 2, by a transverse wall 10, which is extended outwardly beyond the casing at opposite sides thereof to provide an integral follower member, which is adapted to cooperate, in a well-known manner, with the usual rear stops of a railway draft rigging. At the open front end thereof, the casing A is provided with three inwardly converging friction surfaces 11—11—11 of V-shaped transverse cross section.

The friction shoes B are three in number and are slidingly telescoped within the casing A. Each shoe B has a friction surface 12 on its outer side slidingly engaged with one of the friction surfaces 11 of the casing A. On its inner side, each shoe B has an inclined, flat wedge face 13, preferably of V-shaped, transverse cross section. At the inner end, each shoe presents a substantially flat, transverse face 14.

The wedge block C, which receives the actuating force, is provided with three inwardly converging wedge faces 15—15—15 of V-shaped, transverse cross section, engaged with the V-shaped wedge faces 13—13—13 of the shoes B—B—B. The wedge block C is further provided with three radially projecting stop lugs 16—16—16, alternated with the wedge faces, extending between adjacent shoes, and engageable in back of three inturned stop lugs 17—17—17 on the casing A, to limit outward movement of said wedge block and thus hold the parts of the mechanism assembled.

The friction casing D is disposed within the casing A, being open at its rear end, and having a transverse front end wall 18 bearing on the flat inner end faces 14—14—14 of the shoes B—B—B. The casing D is of hexagonal, transverse cross section and is provided with three inwardly converging, interior friction surfaces 19—19—19 at its open end, which are of V-shaped, transverse cross section.

The shoes E are three in number and are slidingly telescoped within the casing D, each shoe having a V-shaped friction surface 20 on its outer side, slidingly engaged with one of the friction surfaces 19 of the casing D. On the inner side, each shoe is provided with a wedge face 21 of V-shaped, transverse cross section, the three wedge faces 21—21—21 of the shoes E—E—E converging inwardly of the casing D. At the inner ends, the shoes E—E—E have flat, transverse abutment faces 22—22—22 for the spring G.

The wedge block F is engaged between the shoes E—E—E, having three rearwardly converging wedge faces 23—23—23 of V-shaped, transverse cross section, engaged with the wedge faces 21—21—21 of the shoes E—E—E. At the outer or rear end, the block F has a flat, transverse face 24, which bears directly on the end wall 10 of the casing A. The wedge block F is held centered by an inwardly projecting lug 25 on the wall 10 of the casing A, engaged in a rearwardly opening central seat 26 in said block.

The spring G is in the form of a helical coil arranged within the casing D and has its opposite ends bearing, respectively, on the wall 18 of the casing D and the flat, inner end faces 22—22—22 of the shoes E—E—E.

The operation of our improved shock absorbing mechanism is as follows: Upon inward movement of the wedge block C, the shoes B—B—B are spread apart and slid inwardly on the friction surfaces of the casing A, yieldingly opposed by the friction shock absorbing means comprising the casing D, shoes E—E—E, wedge block F, and spring G. At the same time, the casing D is moved rearwardly by the shoes B—B—B, causing the wedge block F to be forced inwardly of the casing D, spreading the shoes E—E—E apart, and sliding the same inwardly along the friction surfaces 19—19—19 of said casing, against the resistance of the spring G. High frictional resistance is thus provided during compression of the mechanism by sliding engagement of the friction shoes B—B—B with the friction surfaces of the casing A and sliding engagement of the friction shoes E—E—E with the casing D.

When the actuating force is reduced, the expansive action of the spring G forces the friction shock absorber, comprising the casing D, shoes E—E—E, and wedge block F to expand, thereby forcing the shoes B—B—B and the wedge block C outwardly of the casing A, thus effecting restoration of all of the parts of the mechanism to the full release position shown in Figure 1.

We claim:

1. In a friction shock absorbing mechanism, the combination with a friction casing; of friction shoes slidingly telescoped within the casing; a wedge pressure transmitting member in wedging engagement with the shoes; and frictional resistance means within the casing yieldingly opposing inward movement of said shoes, said frictional resistance means including a second friction casing, friction shoes slidingly telescoped within said second casing, a wedge in wedging engagement with said last named shoes, and a spring within said second named casing yieldingly opposing inward movement of said last named shoes.

2. In a friction shock absorbing mechanism, the combination with a friction casing closed at one end and having interior friction surfaces at the other end; of a set of friction shoes telescoped within said casing, in sliding engagement with the friction surfaces thereof; a wedge adapted to receive the actuating force, said wedge and shoes having cooperating wedge faces; a second friction casing within said first named casing having interior friction surfaces at its rear end and bearing at its front end on the inner ends of said shoes; a second set of friction shoes slidingly telescoped within said second named casing in sliding engagement with the friction surfaces thereof; a second wedge in wedging engagement with said shoes of said second named set, said wedge being buttressed against said closed end of the first named casing; and a spring within said second named casing yieldingly opposing inward movement of said shoes of said second named set with respect to the second named casing.

3. In a friction shock absorbing mechanism, the combination with a friction casing closed at one end and having interior friction surfaces at the other end; of a set of friction shoes telescoped within said casing, in sliding engagement with the friction surfaces thereof; a wedge adapted to receive the actuating force, said wedge and shoes having cooperating wedge faces; a second casing within said first named casing, said second named casing being open at its rear end and closed at its front end by a transverse wall abutting the inner ends of said shoes, said second named casing having interior friction surfaces at its open end; a second set of friction shoes slidingly telescoped within the open end of said second named casing, in sliding engagement with the friction surfaces thereof; a second wedge in wedging engagement with the shoes of said second named set, said last named wedge being buttressed against said closed end of the first named casing; and a spring within the second named casing bearing at opposite ends on the inner ends of the shoes of said second named set, and on said transverse wall of said second named casing.

GEORGE E. DATH.
ARNOLD G. PETERSON.

REFERENCES CITED

The following references are of record in the file of this patent:

UNITED STATES PATENTS

| Number | Name | Date |
| --- | --- | --- |
| 2,446,215 | Dath | Aug. 3, 1948 |
| 2,448,138 | Dath | Aug. 31, 1948 |
| 2,532,013 | Dath | Nov. 28, 1950 |